(12) United States Patent
Yu et al.

(10) Patent No.: US 12,224,943 B2
(45) Date of Patent: Feb. 11, 2025

(54) SERVICE FLOW TRANSMISSION METHOD AND APPARATUS, DEVICE, AND STORAGE MEDIUM

(71) Applicant: ZTE Corporation, Shenzhen (CN)

(72) Inventors: Jinghai Yu, Shenzhen (CN); Chenqiang Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 163 days.

(21) Appl. No.: 17/802,805

(22) PCT Filed: Oct. 27, 2020

(86) PCT No.: PCT/CN2020/124143
§ 371 (c)(1),
(2) Date: Aug. 26, 2022

(87) PCT Pub. No.: WO2021/203680
PCT Pub. Date: Oct. 14, 2021

(65) Prior Publication Data
US 2023/0088040 A1    Mar. 23, 2023

(30) Foreign Application Priority Data
Apr. 8, 2020 (CN) .......................... 202010268167.1

(51) Int. Cl.
*H04L 47/2408* (2022.01)
*H04L 47/52* (2022.01)
(Continued)

(52) U.S. Cl.
CPC ........ *H04L 47/2408* (2013.01); *H04L 47/528* (2013.01); *H04L 47/6275* (2013.01); *H04L 47/6295* (2013.01)

(58) Field of Classification Search
CPC .............. H04L 47/528; H04L 47/2408; H04L 47/6275; H04L 47/6295
See application file for complete search history.

(56) References Cited

U.S. PATENT DOCUMENTS

2008/0075003 A1  3/2008 Lee et al.
2017/0171163 A1* 6/2017 Gareau ................. H04L 9/0637
(Continued)

FOREIGN PATENT DOCUMENTS

CN    108243120 A    7/2018
CN    108924058 A    11/2018
(Continued)

OTHER PUBLICATIONS

International Search Report for corresponding application PCT/CN2020/124143 filed Oct. 27, 2020; Mail date Jan. 27, 2021.
(Continued)

*Primary Examiner* — Melanie Jagannathan
(74) *Attorney, Agent, or Firm* — CANTOR COLBURN LLP

(57) ABSTRACT

Provided are a service flow transmission method and apparatus, a device, and a storage medium. The service flow transmission method includes: acquiring service flows; and performing transmission via different FlexE outgoing interfaces according to priorities of the service flows. By means of determining priorities of service flows, and performing transmission via different FlexE outgoing interfaces according to the priorities of the service flows, mutual interference between service flows can be prevented.

19 Claims, 4 Drawing Sheets

(51) Int. Cl.
*H04L 47/6275* (2022.01)
*H04L 47/6295* (2022.01)

(56) References Cited

U.S. PATENT DOCUMENTS

| | | | | |
|---|---|---|---|---|
| 2018/0013511 A1* | 1/2018 | Hussain | ............. | G02B 6/12033 |
| 2018/0034573 A1* | 2/2018 | Gareau | ................... | H04L 25/49 |
| 2018/0084055 A1* | 3/2018 | Mong | ..................... | H04L 45/50 |
| 2019/0349282 A1 | 11/2019 | Gareau | | |
| 2019/0349311 A1* | 11/2019 | Ji | ........................ | H04L 47/6275 |
| 2019/0373086 A1* | 12/2019 | Qi | ......................... | H04L 47/365 |
| 2019/0386913 A1* | 12/2019 | Wei | ....................... | H04L 47/125 |
| 2020/0007255 A1* | 1/2020 | Gareau | ................ | H04J 3/1658 |
| 2020/0145119 A1* | 5/2020 | Li | ........................... | H04L 47/43 |
| 2020/0162586 A1* | 5/2020 | Li | ........................... | H04L 69/08 |
| 2020/0204499 A1* | 6/2020 | Zhang | ................... | H04J 3/1658 |
| 2020/0228458 A1* | 7/2020 | Huang | ................. | H04J 3/1658 |
| 2020/0259754 A1* | 8/2020 | Chen | ..................... | H04L 49/351 |
| 2020/0322077 A1* | 10/2020 | Du | ........................... | H04L 49/20 |
| 2020/0396097 A1* | 12/2020 | Deng | .................... | H04L 69/22 |
| 2021/0111963 A1* | 4/2021 | Chen | ...................... | H04L 41/12 |
| 2021/0152286 A1* | 5/2021 | Xu | ......................... | H04L 1/0041 |
| 2021/0159999 A1* | 5/2021 | Sun | ...................... | H04L 25/4908 |
| 2021/0194576 A1* | 6/2021 | Gareau | ............. | H04B 10/0793 |
| 2021/0258262 A1* | 8/2021 | Ji | .......................... | H04L 12/413 |
| 2021/0385127 A1* | 12/2021 | Li | ......................... | H04J 3/1658 |
| 2021/0409140 A1* | 12/2021 | Lv | ......................... | H04L 7/0012 |
| 2022/0200722 A1* | 6/2022 | Yi | ............................. | H04J 3/14 |
| 2022/0286220 A1* | 9/2022 | Stracca | ................. | H04J 3/0658 |
| 2023/0015960 A1* | 1/2023 | Dong | ..................... | H04L 45/24 |
| 2023/0035379 A1* | 2/2023 | Li | ......................... | H04L 5/0044 |
| 2023/0088040 A1* | 3/2023 | Yu | ....................... | H04L 47/6295 |
| | | | | 370/392 |

FOREIGN PATENT DOCUMENTS

| | | |
|---|---|---|
| CN | 10898877 A | 12/2018 |
| CN | 109981208 A | 7/2019 |
| EP | 3554026 A1 | 10/2019 |
| EP | 3694140 A1 | 8/2020 |
| EP | 3809616 A1 | 4/2021 |
| WO | 2019084732 A1 | 5/2019 |
| WO | 2020043175 A1 | 3/2020 |

OTHER PUBLICATIONS

Ahmed Nasrallah, "Ultra-Low Latency (ULL) Networks: A Comprehensive Survey Covering the IEEE TSN Standard and Related ULL Research", arxiv,org, Cornell University Library, Mar. 20, 2018, XP080861399.

European Search Report for corresponding application EP20930547; Dated Aug. 24, 2023.

* cited by examiner

SERVICE FLOW TRANSMISSION METHOD AND APPARATUS, DEVICE, AND STORAGE MEDIUM

CROSS REFERENCE

This application is a National Stage Filing of the PCT International Application No. PCT/CN2020/124143 filed on Oct. 27, 2020, which claims priority to Chinese Application No. 202010268167.1 filed on Apr. 8, 2020, the entirety of which is herein incorporated by reference.

TECHNICAL FIELD

Embodiments of the present disclosure relate to the field of communications technologies, and in particular, to a service flow transmission method and apparatus, a device, and a storage medium.

BACKGROUND

A Time Sensitive Network (TSN) is applicable to fields of professional audio and video, automobile control and industry. Service flows corresponding to the TSN generally include different service flows having high priority, such as control signaling, motion control, audio flow, video flow, etc. At present, a 5G communication technology is gradually applied to the TSN, and a bearer network in the 5G communication technology is adopted to realize the transmission of service flows among a plurality of TSNs.

At present, a bearer network mainly adopts Flexible Ethernet (FlexE) as an interface technology to support the transmission of service flows. However, at present the same interface is usually used, at a physical layer of the FlexE, for transmitting different types of service flows having high priority, thereby causing interference between service flows having high priority, leading to an increase in jitter. In addition, scheduling and transmitting different priorities of service flows in a cyclic queue forwarding manner would also increase a transmission delay of the service flows having high priority. To sum up, a current service flow transmission manner in the FlexE cannot meet a communication requirement of a user.

SUMMARY

Provided are a service flow transmission method and apparatus, a device, and a storage medium, which can avoid mutual interference between service flows having high priority.

The embodiments of the present disclosure provide a service flow transmission method, including: acquiring service flows; and performing transmission via different Flexible Ethernet (FlexE) outgoing interfaces according to priorities of the service flows.

The embodiments of the present disclosure provide a service flow transmission apparatus, including: a service flow acquisition module, configured to acquire service flows; and a service flow transmission module, configured to perform transmission via different Flexible Ethernet (FlexE) outgoing interfaces according to priorities of the service flows.

The embodiments of the present disclosure provide a device including: one or more processors; and a storage device arranged to store one or more programs, where the one or more programs, when being executed by the one or more processors, enable the one or more processors to implement the method in the embodiments of the present disclosure.

The embodiments of the present disclosure provide a computer-readable storage medium, on which a computer program is stored, where when the program is executed by a processor, the method in the embodiments of the present disclosure is implemented.

Provided are a service flow transmission method and apparatus, a device, and a storage medium. In the method, priorities of service flows are determined, and transmission is performed via different FlexE outgoing interfaces according to the priorities of the service flows, thereby avoiding mutual interference between service flows.

DETAILED DESCRIPTION

In order to make the objects, technical solutions and advantages of the present disclosure more apparent, the embodiments of the present disclosure will be described hereinafter in detail with reference to the drawings. It should be noted that, in the case of no conflict, the embodiments in the present disclosure and the features in the embodiments may be combined arbitrarily with each other.

Figure 1:
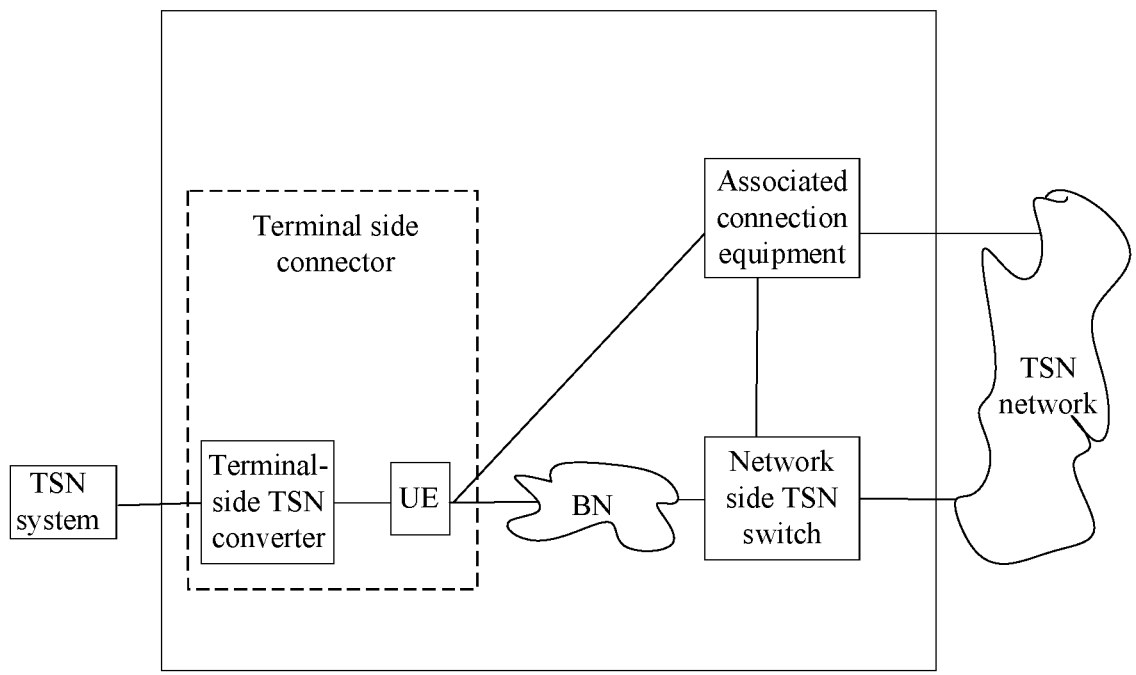
FIG. 1 is a schematic diagram of an application scenario according to the embodiments of the present disclosure.
Figure 2:
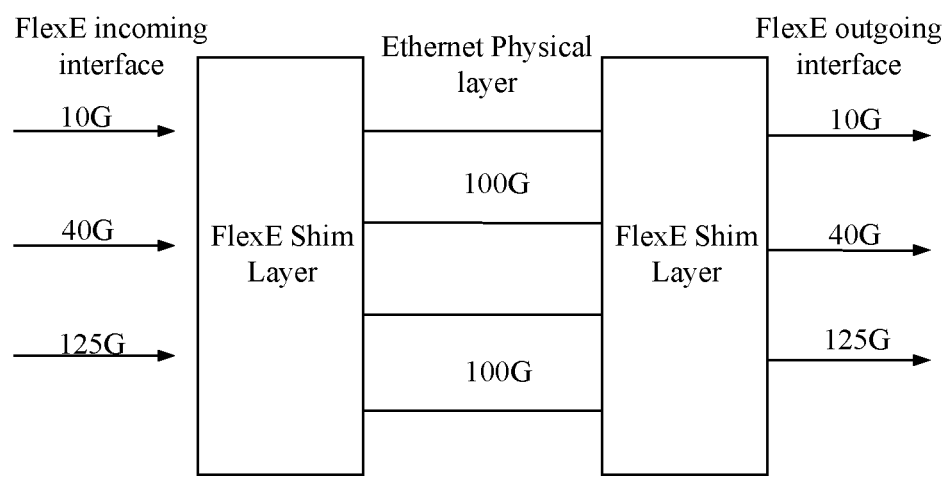
FIG. 2 is an architecture diagram of FlexE according to the embodiments of the present disclosure.

FIG. 1 is a schematic diagram of an application scenario of the embodiments of the present disclosure, and mainly relates to the construction of a network supporting a Time Sensitive Network (TSN) services in 5G, thereby implementing information transmission between two TSN network systems. A Bearer Network (BN) in FIG. 1 is applied to the architecture of Flexible Ethernet (FlexE) in FIG. 2, and transmission of service flows in a TSN is implemented by arranging and scheduling FlexE.

Figure 3:
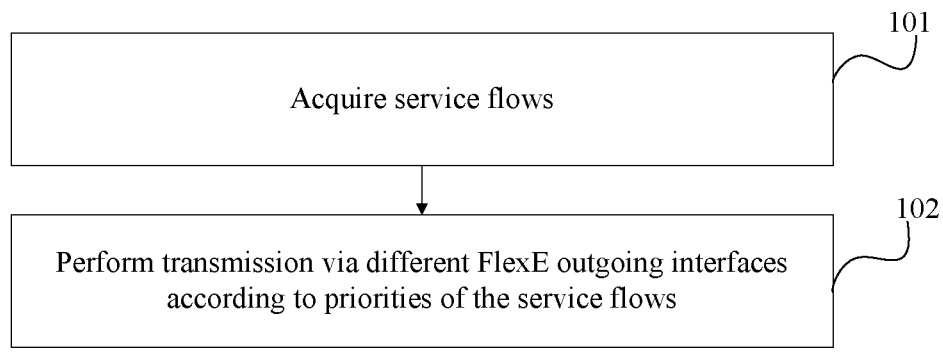
FIG. 3 is a flowchart of a service flow transmission method according to the embodiments of the present disclosure.

FIG. 3 is a schematic flowchart of a service flow transmission method according to the embodiments of the present disclosure. The method may be applicable to a situation in which service flows of different priorities are scheduled and transmitted via different FlexE outgoing interfaces. The method may be executed by the service flow transmission apparatus provided in the embodiments of the present disclosure, and the service flow transmission apparatus is implemented by software and/or hardware and is integrated in one device.

As shown in FIG. 3, which is a flowchart of a service flow transmission method provided in the embodiments of the present disclosure, the method includes the following operations.

At 101, service flows are acquired.

Specifically, in the present embodiment, service flows in a TSN network are acquired via FlexE incoming interfaces in a bearer network. The type of the service flows in the present embodiment may include control signaling, motion control, audio flow, video flow and standard Internet service mode (Best Effort, BE) flow, and the specific types of the service flows are not limited in the present embodiment.

At 102, transmission is performed via different FlexE outgoing interfaces according to priorities of the service flows.

In an example, the operation of performing transmission via different FlexE outgoing interfaces according to the priorities of the service flows may include: first sub-service flows, each of which has a priority belonging to a high priority service, in the service flows are determined; and respective ones of the first sub-service flows are transmitted via different FlexE outgoing interfaces.

Specifically, in this implementation, the service flows may include a plurality of types of sub-service flows. Different sub-service flows may be classified to have different priorities according to functions of the sub-service flows. It may be determined that a priority threshold is 3, and sub-service flows that have priorities higher than the priority threshold are classified as first sub-service flows. For example, the priority of a sub-service flow whose type is control signaling is 4, and the priority of a sub-service flow whose type is audio flow is 5, so that the two sub-service flows may be classified as the first sub-service flows. It can be understood therefrom that the number of the first sub-service flows in the implementation of the present disclosure may be more than one, and the implementation of the present disclosure does not limit the specific number of the first sub-service flows.

It should be noted that, the high priority service in this implementation may also be specified in advance, for example, a service that needs to be preferentially executed in an execution process is referred to as a high priority service, and a plurality of types of high priority services may be specified in advance. The priority of a service flow may be compared with a known type of high priority service, and a service flow having a priority belonging to a high priority service is referred to as a first sub-service flow.

In an example, the operation of performing transmission via different FlexE outgoing interfaces according to the priorities of the service flows may further include: at least one second sub-service flow, each of which has a priority not belonging to the high priority, in the service flows are determined; and each of the at least one second sub-service flow is transmitted via a FlexE outgoing interface for transmitting a first service sub-flow in a same direction as the second service sub-flow.

In an example, a bearing capacity of each of the FlexE outgoing interfaces is greater than a sum of bandwidth requirements of the first sub-service flow and the second sub-service flow that are transmitted via the FlexE outgoing interface.

Specifically, in this implementation, a sub-service flow, whose priority is lower than the priority threshold, in the service flows may be classified as a second sub-service flow. For example, the priority of a sub-service flow whose type is a BE flow is 2, then the sub-service flow may be classified as the second sub-service flow, and the second sub-service flow is transmitted via a FlexE outgoing interface for transmitting a first sub-service flow in a same direction as the second sub-service flow.

It should be noted that, in this implementation, the priorities of the first sub-service flows are higher than the priorities of the second sub-service flows; therefore, the first sub-service flows may also be collectively referred to as service flows having high priority, and the second sub-service flows may be collectively referred to as low priority service flows.

It should be noted that, in this implementation, it is required to create FlexE outgoing interfaces according to the first sub-service flows, that is, the number of the created FlexE outgoing interfaces needs to be the same as the number of the first sub-service flows, and the creation manner for the FlexE outgoing interfaces in this implementation includes static creation and dynamic creation.

Figure 4:
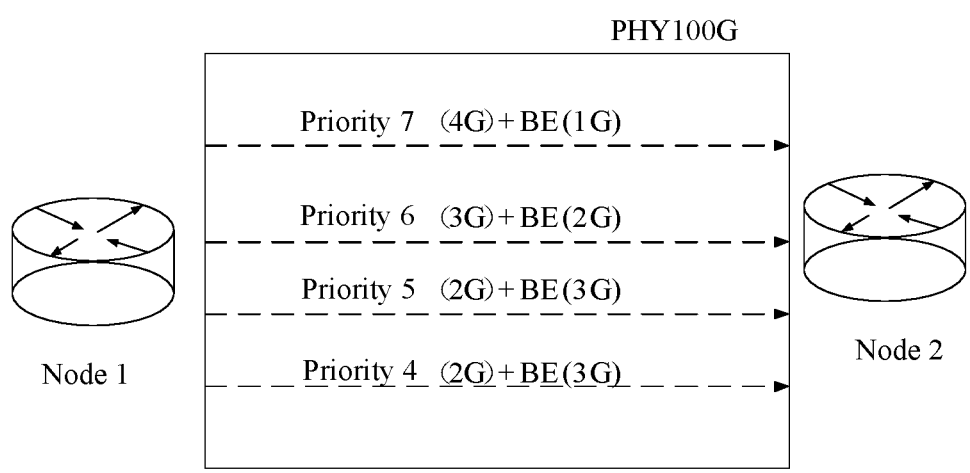
FIG. 4 is a schematic diagram of statically creating FlexE outgoing interfaces according to the embodiments of the present disclosure.

In an exemplary implementation, as shown in FIG. 4, which is a schematic diagram of statically creating FlexE outgoing interfaces in an embodiment of the present disclosure, it is determined that the number of first sub-service flows is four, which are respectively a first sub-service flow having a priority of 7 and a bandwidth requirement of 4G, a first sub-service flow having a priority of 6 and a bandwidth requirement of 3G, a first sub-service flow having a priority of 5 and a bandwidth requirement of 2G, and a first sub-service flow having a priority of 4 and a bandwidth requirement of 2G. Configuration data is delivered by a controller to bear nodes, i.e., a node 1 and a node 2, four corresponding FlexE outgoing interfaces are created on a FlexE physical layer, each FlexE outgoing interface is used for one first sub-service flow separately, and the same FlexE outgoing interface can be used for a second sub-service flow, for example, a BE flow, that is transmitted in the same direction as the first sub-service flow; therefore, the first sub-service flow and the second sub-service flow can be transmitted simultaneously in the same FlexE outgoing interface, but the number of the first sub-service flows in each FlexE outgoing interface is only 1. Furthermore, the bearer capacity of each FlexE outgoing interface is greater than the sum of the bandwidth requirement of the first sub-service flow and the bandwidth requirement of the second sub-service flow.

Figure 5:
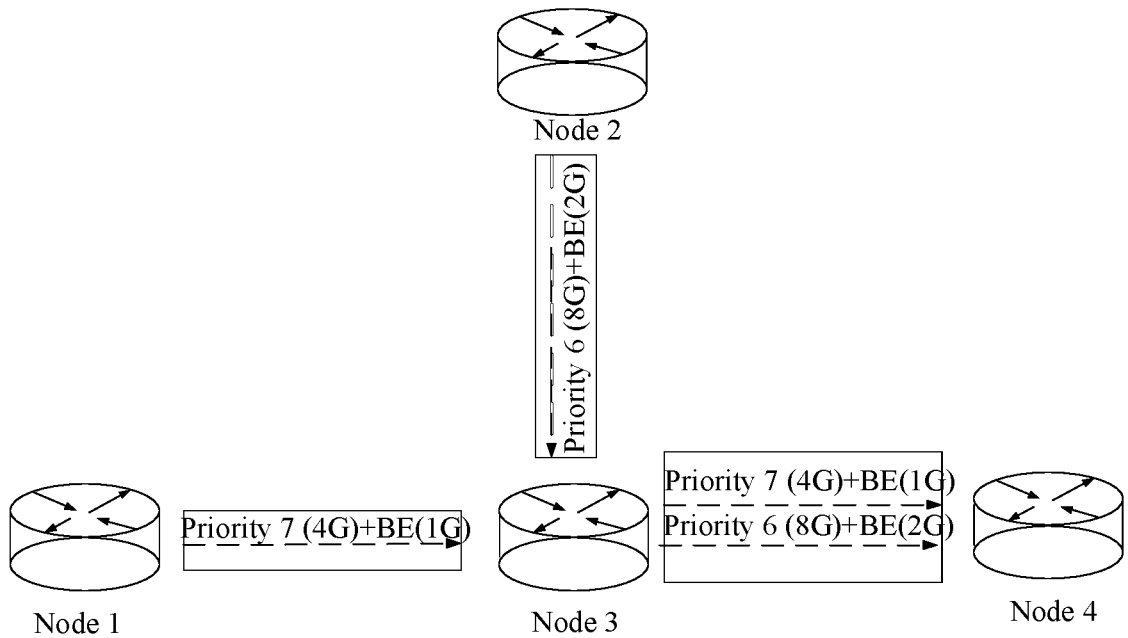
FIG. 5 is another schematic diagram of statically creating FlexE outgoing interfaces according to the embodiments of the present disclosure.

In another exemplary implementation, as shown in FIG. 5, which is another schematic diagram of statically creating FlexE outgoing interfaces in an embodiment of the present disclosure, it is determined that the number of first sub-service flows is two, which are respectively a first sub-service flow having a priority of 7 and a bandwidth requirement of 4G, and a first sub-service flow having with a priority of 6 and a bandwidth requirement is 8G. The two first sub-service flows are respectively from different nodes. The first sub-service flow having the priority of 7 is from a node 1 to a node 4 through a node 3, and the first sub-service flow having the priority of 6 is from a node 2 to a node 4 through a node 3. A controller delivers configuration data to the bearer nodes, i.e., the node 1, the node 3, and the node 4, and a first FlexE outgoing interface corresponding to the first sub-service flow having the priority of 7 is created at the FlexE physical layer. The controller delivers configuration data to the bearer nodes, i.e., the node 2, the node 3, and the node 4, and a FlexE second outgoing interface corresponding to the first sub-service flow having the priority of 6 is created at the FlexE physical layer. The second sub-service flow, such as the BE flow, that can be transmitted in the same direction as the first sub-service flow can adopt the same FlexE outgoing interface, and therefore, the first sub-service flow and the second sub-service flow can be transmitted via the same FlexE outgoing interface, but the number of the first sub-service flow in one FlexE outgoing interface is 1. Furthermore, the bearer capacity of each FlexE outgoing interface is greater than a sum of the bandwidth requirement of the first sub-service flow and the bandwidth requirement of the second sub-service flow.

It should be noted that, in this implementation, dynamically creating FlexE outgoing interfaces refers to that the service flow is acquired in real time, and the FlexE outgoing interfaces corresponding to the first sub-service flows are dynamically created according to the number of first sub-service flows included in the service flows and according to a predetermined rule.

In the service flow transmission method provided in the embodiments of the present disclosure, priorities of service flows are determined, and transmission is performed via different FlexE outgoing interfaces according to the priorities of the service flows, thereby avoiding mutual interference between service flows.

Figure 6:
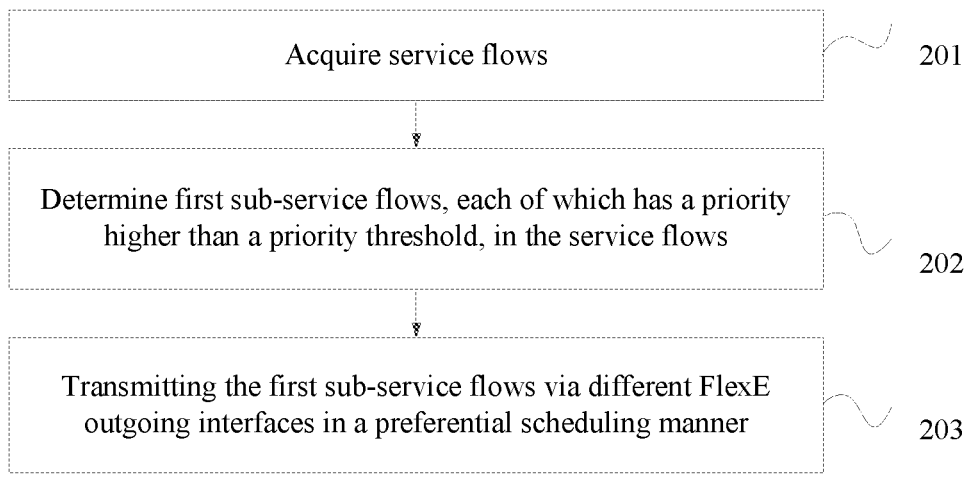
FIG. 6 is a flowchart of a service flow transmission method according to the embodiments of the present disclosure.

FIG. 6 is a flowchart of a service flow transmission method according to the embodiments of the present disclosure. The method may include the following operations.

At 201, service flows are acquired.

At 202, first sub-service flows, each of which has a priority higher than a priority threshold, in the service flows are acquired.

At 203, respective ones of the first service sub-flows are transmitted via different FlexE outgoing interfaces in a preferential scheduling manner.

In an example, each FlexE outgoing interface includes a high priority queue group and a low priority queue group. After creation of the FlexE outgoing interfaces according to the first service sub-flows, the method further includes: storing each of the first sub-service flows in the high priority queue group of the corresponding FlexE outgoing interface; and storing the second sub-service flow transmitted in the same direction as the first sub-service flow in the low priority queue group of the corresponding FlexE outgoing interface.

In an example, transmitting the respective ones of the first sub-service flows in the preferential scheduling manner via different FlexE outgoing interfaces may include: in a case of determining that the high priority queue group and the low priority queue group both include a sub-service flow, performing preferential scheduled transmission of the first sub-service flow in the high priority queue group in a first-in-first-out (FIFO) manner; and after determining that scheduling of the high priority queue group is completed, performing scheduled transmission of the second sub-service flow in the low priority queue group.

In an example, transmitting the respective ones of the first sub-service flows in the preferential scheduling manner via different FlexE outgoing interfaces may include: in a case of determining that the high priority queue group does not include a first sub-service flow and the low priority queue group includes a second sub-service flow, performing scheduled transmission of the second sub-service flow in the low priority queue group; where when performing the scheduled transmission of the second sub-service flow, in a case where a new first sub-service flow joins in the high priority queue group, the scheduled transmission of the second sub-service flow is interrupted, and after scheduled transmission of the new first sub-service flow is completed, the scheduled transmission of the second sub-service flow is restarted.

Figure 7:
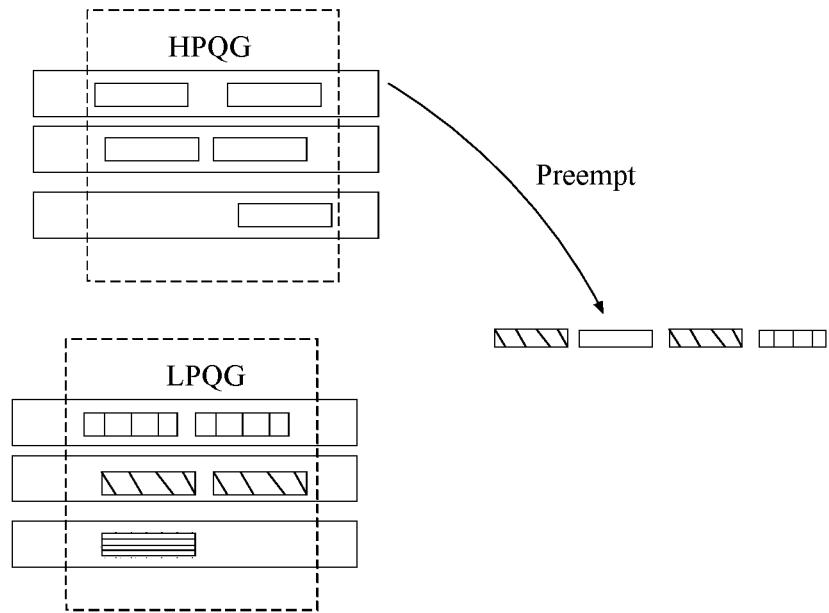
FIG. 7 is a schematic diagram of a principle of preferential scheduled transmission according to the embodiments of the present disclosure.

Specifically, FIG. 7 is a schematic diagram of a principle of preferential scheduled transmission according to the embodiments of the present disclosure. Each FlexE outgoing interface includes a High Priority Queue Group (HPQG) and a Low Priority Queue Group (LPQG), where the HPQG is configured to store each first sub-service flow, and the LPQG is configured to store a second sub-service flow that is transmitted in the same direction as the first sub-service flow. In the case where the scheduled transmission of the first sub-service flow in the HPQG has been completed, in a case of determining that there is no first sub-service flow in the HPQG and there is a second sub-service flow in the LPQG, for example, as shown in FIG. 7 in which the LPQG includes three second sub-service flows, in the process of performing scheduled transmission of the second sub-service flows in sequence from top to bottom, if a new first sub-service flow is added in the HPQG when performing scheduled transmission of the second one of the three second sub-service flows, the scheduled transmission of the current second sub-service flow is interrupted, and is continued after the scheduled transmission of the new first sub-service flow is completed, i.e. the new first sub-service flow preempts the scheduled transmission of the second sub-service flow, so that the service flow in the HPQG can be preferentially transmitted.

In the service flow transmission method provided in the embodiments of the present disclosure, priorities of service flows are acquired, and transmission is performed via different FlexE outgoing interfaces according to the priorities of the service flows, thereby avoiding mutual interference between the service flows. Furthermore, the service flows having high priority are transmitted in a preferential scheduling manner, thereby satisfying a low-latency transmission requirement.

Figure 8:
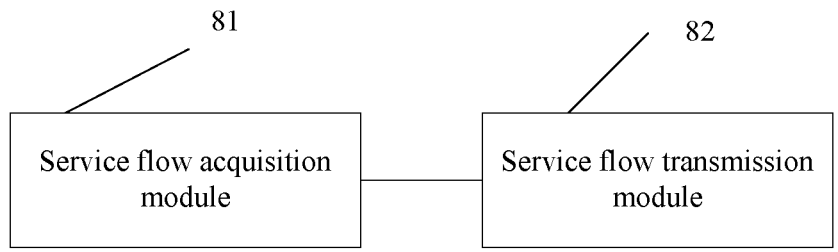
FIG. 8 is a schematic structural diagram of a service flow transmission apparatus according to the embodiments of the present disclosure.

FIG. 8 is a schematic structural diagram of a service flow transmission apparatus according to the embodiments of the present disclosure. As shown in FIG. 8, the apparatus includes: a service flow acquisition module 81, configured to acquire service flows; and a service flow transmission module 82, configured to perform transmission via different FlexE outgoing interfaces according to priorities of the service flows.

The service flow transmission apparatus provided in the embodiment is configured to implement the service flow transmission method. The implementation principles and technical effects of the service flow transmission apparatus provided in the embodiment are similar to those of the service flow transmission method in the above embodiments of the present disclosure, and are not described herein again.

In one example, the service flow transmission module is configured to: determine first sub-service flows, each of which has a priority belonging to a high priority service, in the service flows; and transmit respective ones of the first sub-service flows via different FlexE outgoing interfaces.

In one example, the service flow transmission module is configured to: determine at least one second sub-service flow, each of which has a priority not belonging to the high priority, in the service flows; and transmit each of the at least one second service sub-flow via a FlexE outgoing interface for transmitting a first service sub-flow in a same direction as the second service sub-flow.

In an example, a bearing capacity of each of the FlexE outgoing interfaces is greater than a sum of bandwidth requirements of the first sub-service flow and the second sub-service flow that are transmitted via the FlexE outgoing interface.

In an example, the service flow transmission module, when being executed to transmit the respective ones of the first sub-service flows via different FlexE outgoing interfaces, is configured to transmit the respective ones of the first sub-service flows in a preferential scheduling manner via different FlexE outgoing interfaces.

In an example, each of the FlexE outgoing interfaces includes a high priority queue group and a low priority queue group. The apparatus further includes: a service flow storage module, configured to store each of the first sub-service flows in the high priority queue group of the corresponding FlexE outgoing interface; and store the second sub-service flow transmitted in the same direction as the first sub-service flow in the low priority queue group of the corresponding FlexE outgoing interface.

In an example, the service flow transmission module, when being executed to transmit the respective ones of the first sub-service flows in the preferential scheduling manner via different FlexE outgoing interfaces, is configured to: in a case of determining that the high priority queue group and the low priority queue group both include a sub-service flow, perform preferential scheduled transmission of the first sub-service flow in the high priority queue group in a first-in-first-out (FIFO) manner; and after determining that scheduling of the high priority queue group is completed, perform scheduled transmission of the second sub-service flow in the low priority queue group.

In an example, the service flow transmission module, when being executed to transmit the respective ones of the first sub-service flows in the preferential scheduling manner via different FlexE outgoing interfaces, is configured to: in a case of determining that the high priority queue group does not include a first sub-service flow and the low priority queue group includes a second sub-service flow, perform scheduled transmission of the second sub-service flow in the low priority queue group; where when performing the scheduled transmission of the second sub-service flow, in a case where a new first sub-service flow joins in the high priority queue group, the scheduled transmission of the second sub-service flow is interrupted, and after scheduled transmission of the new first sub-service flow is completed, the scheduled transmission of the second sub-service flow is restarted.

Figure 9:
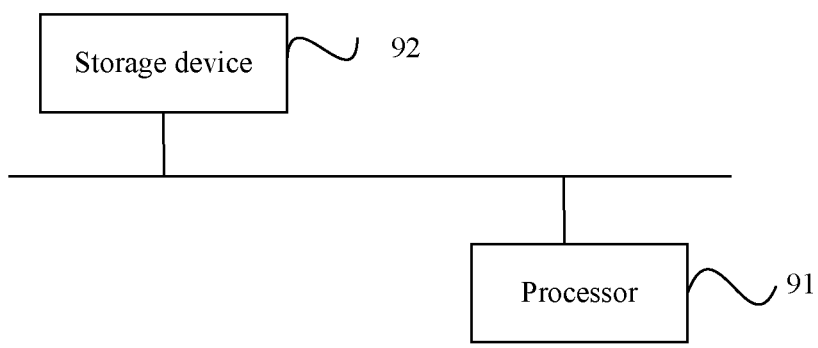
FIG. 9 is a schematic structural diagram of a device according to the embodiments of the present disclosure.

As shown in FIG. 9, which is a schematic structural diagram of a device according to the embodiments of the present disclosure, the device provided in the embodiments of the present disclosure includes: one or more processors 91 and a storage device 92. There may be one or more processors 91 in the device, and in FIG. 9, only one processor 91 is shown as an example. The storage device 92 is configured to store one or more programs, and the one or more programs, when being executed by the one or more processors 91, enable the one or more processors 91 to implement the service flow transmission method according to the embodiments of the present disclosure.

The one or more processors 91 and the storage device 92 in the device may be connected by using a bus or in another manner, and the connection by using a bus in FIG. 9 is shown as an example.

As a computer-readable storage medium, the storage device 92 may be configured to store a software program, a computer executable program, and at least one module, for example, the program instruction/module corresponding to the service flow transmission method according to the embodiments of the present disclosure. The storage device 92 may include a program storage area and a data storage area, where the program storage area may store an operating system and an application program required by at least one function; and the storage data area may store data created during running of the device. In addition, the storage device 92 may include a high-speed random access memory, and may further include a non-volatile memory, for example, at least one magnetic disk storage device, at least one flash memory device, or other non-volatile solid-state storage devices. In some examples, the storage device 92 may further include a memory which is remotely located from the one or more processors 91 and is connected to the device over a network. Examples of such networks include, but are not limited to, the Internet, intranets, local area networks, mobile communication networks, and combinations thereof.

The embodiments of the present disclosure provide a storage medium, on which a computer program is stored, and when the program is executed by a processor, the service flow transmission method according to any one of the embodiments of the present disclosure is implemented.

In the service flow transmission method, service flows are acquired; and transmission is performed via different FlexE outgoing interfaces according to priorities of the service flows.

The foregoing descriptions are merely exemplary embodiments of the present disclosure, but are not intended to limit the scope of protection of the present disclosure.

In general, various embodiments of the disclosure may be implemented in hardware or special purpose circuits, software, logic, or any combination thereof. For example, some aspects may be implemented in hardware, while other aspects may be implemented in firmware or software that may be executed by a controller, a microprocessor or other computing devices, although the disclosure is not limited thereto.

The embodiments of the disclosure can be implemented by execution of computer program instructions by a data processor of a mobile device, such as in a processor entity, by hardware, or by a combination of software and hardware. The computer program instructions may be assembly instructions, Instruction Set Architecture (ISA) instructions, machine instructions, machine-related instructions, microcode, firmware instructions, state setting data, or source or object code written in any combination of one or more programming languages.

The block diagrams of any logic flow in the figures of the present disclosure may represent program operations, or may represent interconnected logic circuits, modules, and functions, or may represent combinations of program operations and logic circuits, modules, and functions. The computer program may be stored on a memory. The memory may be of any type suitable to the local technical environment and can be implemented using any suitable data storage technology, such as, but not limited to, Read-Only Memory (ROM), Random Access Memory (RAM), optical memory devices and systems (Digital Video Disc (DVD) or Compact Disk (CD)), etc. Computer-readable media may include non-transitory storage media. The data processor may be of any type suitable to the local technical environment, such as, but not limited to, a general purpose computer, a special purpose computer, a microprocessor, a Digital Signal Processing (DSP), an Application Specific Integrated Circuit (ASIC), a Field-Programmable Gate Array (FGPA), and a processor based on a multi-core processor architecture.

Detailed descriptions of exemplary embodiments of the present disclosure have been provided above by way of illustrative and non-limiting examples. It will be apparent to those skilled in the art that various modifications and adaptations to the above embodiments can be made without departing from the scope of the disclosure. Therefore, the proper scope of the present disclosure will be determined according to the claims.

What is claimed is:

1. A service flow transmission method, comprising:
acquiring service flows; and
performing transmission via different Flexible Ethernet (FlexE) outgoing interfaces according to priorities of the service flows, wherein performing transmission via different FlexE outgoing interfaces according to the priorities of the service flows comprises: determining first sub-service flows, each of which has a priority belonging to a high priority service, in the service flows; and transmitting respective ones of the first sub-service flows via different FlexE outgoing interfaces.

2. The method according to claim 1, wherein performing transmission via different FlexE outgoing interfaces according to the priorities of the service flows further comprises:
determining at least one second sub-service flow, each of which has a priority not belonging to the high priority, in the service flows; and
transmitting each of the at least one second service sub-flow via a FlexE outgoing interface for transmitting a first service sub-flow in a same direction as the second service sub-flow.

3. The method according to claim 2, wherein a bearing capacity of each of the FlexE outgoing interfaces is greater than a sum of bandwidth requirements of the first sub-service flow and the second sub-service flow that are transmitted via the FlexE outgoing interface.

4. The method according to claim 3, wherein transmitting the respective ones of the first sub-service flows via different FlexE outgoing interfaces comprises:
transmitting the respective ones of the first sub-service flows in a preferential scheduling manner via different FlexE outgoing interfaces.

5. The method according to claim 4, wherein each of the FlexE outgoing interfaces comprises a high priority queue group and a low priority queue group; and
the method further includes:
storing each of the first sub-service flows in the high priority queue group of the corresponding FlexE outgoing interface; and
storing the second sub-service flow transmitted in the same direction as the first sub-service flow in the low priority queue group of the corresponding FlexE outgoing interface.

6. The method according to claim 5, wherein transmitting the respective ones of the first sub-service flows in the preferential scheduling manner via different FlexE outgoing interfaces comprises:
in a case of determining that the high priority queue group and the low priority queue group both comprise a sub-service flow, performing preferential scheduled transmission of the first sub-service flow in the high priority queue group in a first-in-first-out (FIFO) manner; and
after determining that scheduling of the high priority queue group is completed, performing scheduled transmission of the second sub-service flow in the low priority queue group.

7. The method according to claim 5, wherein transmitting the respective ones of the first sub-service flows in the preferential scheduling manner via different FlexE outgoing interfaces comprises:
in a case of determining that the high priority queue group does not comprise a first sub-service flow and the low priority queue group comprises a second sub-service flow, performing scheduled transmission of the second sub-service flow in the low priority queue group;
wherein when performing the scheduled transmission of the second sub-service flow, in a case where a new first sub-service flow joins in the high priority queue group, the scheduled transmission of the second sub-service flow is interrupted, and after scheduled transmission of the new first sub-service flow is completed, the scheduled transmission of the second sub-service flow is restarted.

8. A service flow transmission apparatus, comprising a memory storing instructions and a processor in communication with the memory, wherein the processor is configured to execute the instructions to:
acquire service flows; and
perform transmission via different Flexible Ethernet (FlexE) outgoing interfaces according to priorities of the service flows, wherein the processor, when performing transmission via different FlexE outgoing interfaces according to the priorities of the service flows, is configured to execute the instructions to: determine first sub-service flows, each of which has a priority belonging to a high priority service, in the service flows; and transmit respective ones of the first sub-service flows via different FlexE outgoing interfaces.

9. A device, comprising:
one or more processors; and
a storage device arranged to store one or more programs, wherein the one or more programs, when being executed by the one or more processors, enable the one or more processors to implement the method according to claim 1.

10. A non-transitory computer-readable storage medium, on which a computer program is stored, wherein when the program is executed by a processor, the method according to claim 1 is implemented.

11. The method according to claim 1, wherein performing transmission via different FlexE outgoing interfaces according to the priorities of the service flows further comprises:
determining first sub-service flows, each of which has a priority higher than a preset priority threshold, in the service flows; and
transmitting respective ones of the first sub-service flows via different FlexE outgoing interfaces.

12. The method according to claim 11, wherein performing transmission via different FlexE outgoing interfaces according to the priorities of the service flows further comprises:
determining at least one second sub-service flow, each of which has a priority lower than the priority threshold, in the service flows; and
transmitting each of the at least one second service sub-flow via a FlexE outgoing interface for transmitting a first service sub-flow in a same direction as the second service sub-flow.

13. The method according to claim 12, wherein a bearing capacity of each of the FlexE outgoing interfaces is greater than a sum of bandwidth requirements of the first sub-service flow and the second sub-service flow that are transmitted via the FlexE outgoing interface.

14. The method according to claim 13, wherein transmitting the respective ones of the first sub-service flows via different FlexE outgoing interfaces comprises:
   transmitting the respective ones of the first sub-service flows in a preferential scheduling manner via different FlexE outgoing interfaces.

15. The method according to claim 14, wherein each of the FlexE outgoing interfaces comprises a high priority queue group and a low priority queue group; and
   the method further includes:
      storing each of the first sub-service flows in the high priority queue group of the corresponding FlexE outgoing interface; and
      storing the second sub-service flow transmitted in the same direction as the first sub-service flow in the low priority queue group of the corresponding FlexE outgoing interface.

16. The method according to claim 15, wherein transmitting the respective ones of the first sub-service flows in the preferential scheduling manner via different FlexE outgoing interfaces comprises:
   in a case of determining that the high priority queue group and the low priority queue group both comprise a sub-service flow, performing preferential scheduled transmission of the first sub-service flow in the high priority queue group in a first-in-first-out (FIFO) manner; and
   after determining that scheduling of the high priority queue group is completed, performing scheduled transmission of the second sub-service flow in the low priority queue group.

17. The method according to claim 15, wherein transmitting the respective ones of the first sub-service flows in the preferential scheduling manner via different FlexE outgoing interfaces comprises:
   in a case of determining that the high priority queue group does not comprise a first sub-service flow and the low priority queue group comprises a second sub-service flow, performing scheduled transmission of the second sub-service flow in the low priority queue group;
   wherein when performing the scheduled transmission of the second sub-service flow, in a case where a new first sub-service flow joins in the high priority queue group, the scheduled transmission of the second sub-service flow is interrupted, and after scheduled transmission of the new first sub-service flow is completed, the scheduled transmission of the second sub-service flow is restarted.

18. The method according to claim 1, further comprising:
   creating the FlexE outgoing interfaces according to the first sub-service flows, wherein the number of the created FlexE outgoing interfaces is the same as the number of the first sub-service flows.

19. The method according to claim 18, wherein a creation manner for the FlexE outgoing interfaces comprises: static creation or dynamic creation.

\* \* \* \* \*